United States Patent Office 3,078,640
Patented Feb. 26, 1963

3,078,640
SEPARATION OF SULFUR COMPOUNDS
FROM VAPOR MIXTURES
Robert M. Milton, Buffalo, N.Y., assignor to Union
Carbide Corporation, a corporation of New York
Filed Dec. 18, 1959, Ser. No. 860,526
7 Claims. (Cl. 55—73)

This invention relates to a method for adsorbing fluids and separating a mixture of fluids into its component parts. More particularly, the invention relates to a method of adsorbing hydrogen sulfide with adsorbents of the molecular sieve type. Still more particularly, the invention relates to a method for preferentially adsorbing hydrogen sulfide from a vapor mixture containing at least one member of the group consisting of hydrogen, carbon dioxide and normal saturated aliphatic hydrocarbons containing less than nine carbon atoms per molecule.

This separation is advantageous in, for example, sweetening the defined vapor streams thereby preventing the deposition of sulfur compounds which can cause plugging and corrosion of transmission pipes, valves, regulators and the like. Also, the sulfur compounds may produce undesirable side reactions with other materials contacting the vapor mixture.

Broadly, the invention comprises mixing molecules, in a fluid state, of the materials to be adsorbed or separated with at least partially dehydrated crystalline synthetic metal-aluminum-silicates, which will be described more particularly below, and effecting the adsorption of the adsorbate by the silicate. The synthetic silicate used in the process of the invention is in some respects similar to naturally occurring zeolites. Accordingly, the term "zeolite" would appear to be appropriately applied to these materials. There are, however, significant differences between the synthetic and natural silicates. To distinguish the synthetic material used in the method of the invention from the natural zeolites and other similar synthetic silicates, the sodium-aluminum-silicate and its derivatives taught hereinafter to be useful in the process of the invention will be designated by the term "zeolite A." While the structure and preferred method of making zeolite A will be discussed in some detail in this application, additional information about the material and its preparation may be found in an application filed December 24, 1953, Serial No. 400,388, now U.S. Patent 2,882,243.

It is the principal object of the present invention to provide a process for the selective adsorption of hydrogen sulfide from fluids. A further object of the invention is to provide a method whereby hydrogen sulfide may be adsorbed and separated by crystalline synthetic metal-aluminum-silicate from fluid mixtures with other molecules.

Figure 1:
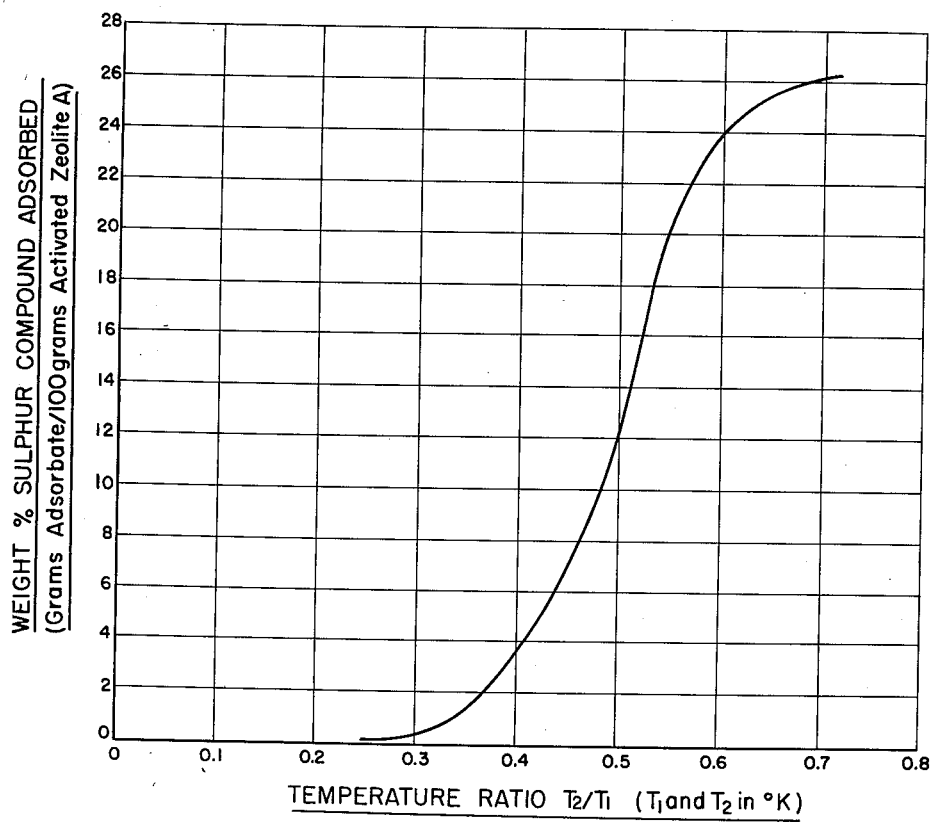
FIG. 1 is a graph showing the amount of sulfur compounds adsorbed versus the temperature ratio $T_2/T_1$ for various forms of zeolite A.

Certain adsorbents, including zeolite A, which selectively adsorb molecules on the basis of the size and shape of the adsorbate molecule are referred to as molecular sieves. These molecular sieves have a sorption area available on the inside of a large number of uniformly sized pores of molecular dimensions. With such an arrangement molecules of a certain size and shape enter the pores and are adsorbed while larger or differently shaped molecules are excluded. Not all adsorbents behave in the manner of the molecular sieves. Such common adsorbents are charcoal and silica gel, for example, do not exhibit molecular sieve action.

Zeolite A consists basically of a three-dimensional framework of $SiO_4$ and $AlO_4$ tetrahedra. The tetrahedra are cross-linked by the sharing of oxygen atoms so that the ratio of oxygen atoms to the total of the aluminum and silicon atoms is equal to two or $O/(Al+Si)=2$. The electrovalence of the tetrahedra containing aluminum is balanced by the inclusion in the crystal of a cation, for example, an alkali or alkaline earth metal ion. This balance may be expressed by the formula

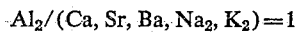

$$Al_2/(Ca, Sr, Ba, Na_2, K_2)=1$$

One cation may be exchanged for another by ion exchange techniques which are described below. The spaces between the tetrahedra are occupied by water molecules prior to dehydration.

Zeolite A may be activated by heating to effect the loss of the water of hydration. The dehydration results in crystals interlaced with channels of molecular dimensions that offer very high surface areas for the adsorption of foreign molecules. These interstitial channels will not accept molecules that have a maximum dimension of the minimum projected cross-section in excess of about 5.5 A. Factors influencing occlusion by the activated zeolite A crystals are the size and polarizing power of the interstitial cation, the polarizability and polarity of the occluded molecules, the dimensions and shape of the sorbed molecule relative to those of the channels, the duration and severity of dehydration and desorption, and the presence of foreign molecules in the interstitial channels. It will be understood that the refusal characteristics of zeolite A are quite as important as the adsorptive or positive adsorption characteristics.

Although there are a number of cations that may be present in zeolite A it is preferred to formulate or synthesize the sodium form of the crystal since the reactants are readily available and water soluble. The sodium in the sodium form of zeolite A may be easily exchanged for other cations as will be shown below. Essentially the preferred process comprises heating a proper mixture in aqueous solution of the oxides, or of materials whose chemical compositions can be completely represented as mixtures of the oxides, $Na_2O$, $Al_2O_3$, $SiO_2$ and $H_2O$, suitably at a temperature of about 100° C. for periods of time ranging from 15 minutes to 90 hours or longer. The product which crystallizes from the hot mixture is filtered off and washed with distilled water until the effluent wash water in equilibrium with the zeolite has a pH of from about 9 to 12. The material, after activation, is ready for use as a molecular sieve.

Zeolite A may be distinguished from other zeolites and silicates on the basis of its X-ray powder diffraction pattern. The X-ray patterns for several of the ion exchanged forms of zeolite A are described below. Other characteristics that are useful in identifying zeolite A are its composition and density.

The basic formula for all crystalline zeolites where "M" represents a metal and "n" its valence may be represented as follows:

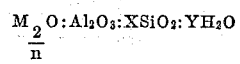

$$M_{\frac{2}{n}}O : Al_2O_3 : XSiO_2 : YH_2O$$

In general a particular crystalline zeolite will have values for X and Y that fall in a definite range. The value X for a particular zeolite will vary somewhat since the aluminum atoms and the silicon atoms both occupy essentially equivalent positions in the lattice. Minor variations in the relative numbers of these atoms do not significantly alter the crystal structure or physical properties of the zeolite. For zeolite A, numerous analyses have shown that an average value for X is about 1.85. The X value falls within the range 1.85±0.5.

The value of Y likewise is not necessarily an invariant for all samples of zeolite A particularly among the various ion exchanged forms of zeolite A. This is true because various exchangeable ions are of different size, and, since there is no major change in the crystal lattice dimensions upon ion exchange, more or less space should be available in the pores of the zeolite A to accommodate water molecules. For instance, sodium zeolite A was partially exchanged with magnesium, and lithium, and the pore volume of these forms, in the activated condition, measured with the following results:

| Ion Exchanged Form of Zeolite A | Percent Na Ions Replaced | Value of Y |
|---|---|---|
| Na | 0 | 5.1 |
| Mg | 75 | 5.8 |
| K | 95 | 4 |
| Ca | 93 | 5 |

The average value for Y thus determined for the fully hydrated sodium zeolite A was 5.1; and in varying conditions of hydration, the value of Y can vary from 5.1 to essentially zero. The maximum value of Y has been found in 75% exchanged magnesium zeolite A, the fully hydrated form of which has a Y value of 5.8. In general an increase in the degree of ion exchange of the magnesium form of zeolite A results in an increase in the Y value. Larger values, up to 6, may be obtained with more fully ion exchanged materials.

In zeolite A synthesized according to the preferred procedure, the ratio $Na_2O/Al_2O_3$ should equal one. But if all of the excess alkali present in the mother liquor is not washed out of the precipitated product, analysis may show a ratio greater than one, and if the washing is carried too far, some sodium may be ion exchanged by hydrogen, and the ratio will drop below one. Thus, a typical analysis for a thoroughly washed sodium zeolite A is $0.99Na_2O:1.0Al_2O_3:1.85SiO_2:5.1H_2O$. The ratio $Na_2O/Al_2O_3$ has varied as much as 23%. The composition for zeolite A lies in the range of $$\frac{M_2O}{n} = 1.0 \pm 0.2$$
$$\overline{Al_2O_3}$$

where "M" represents a metal and "n" its valence.

Thus the formula for zeolite A may be written as follows:

$$1.0 \pm 0.2 M_{\frac{2}{n}} O : Al_2O_3 : 1.85 \pm 0.5 SiO_2 : YH_2O$$

In this formula "M" represents a metal, "n" its valence, and "Y" may be any value up to 6 depending on the identity of the metal and the degree of dehydration of the crystals.

The pores of zeolite A are normally filled with water and in this case, the above formula represents their chemical analysis. When other materials as well as water are in the pores of zeolite A, chemical analysis will show a lower value of Y and the presence of other adsorbates. The presence in the pores of non-volatile materials, such as sodium chloride and sodium hydroxide, which are not removable under normal conditions of activation at temperatures of from 100° C. to 650° C. does not significantly alter the crystal lattice or structure of zeolite A although it will of necessity alter the chemical composition.

The apparent density of fully hydrated samples of zeolite A were determined by the flotation of the crystals on liquids of appropriate densities. The technique and liquids used are discussed in an article entitled "Density of Liquid Mixture" appearing in Acta Crystallographica, 1951, vol. 4, page 565. The densities of several such crystals are as follows:

| Form of Zeolite A | Percent of Exchange | Density, g./cc. |
|---|---|---|
| Sodium | 100 | 1.99±0.1 |
| Lithium | 65 | 1.92±0.1 |
| Potassium | 95 | 2.08±0.1 |
| Cesium | 31 | 2.26±0.1 |
| Magnesium | 75 | 2.04±0.1 |
| Calcium | 93 | 2.05±0.1 |
| Thallous | 80 | about 3.36 |

In making the sodium form of zeolite A, representative reactants are silica gel, silicic acid or sodium silicate as a source of silica. Alumina may be obtained from activated alumina, gamma alumina, alpha alumina, alumina trihydrate, or sodium aluminate. Sodium hydroxide may supply the sodium ion and in addition assist in controlling the pH. Preferably the reactants are water soluble. A solution of the reactants in the proper proportions is placed in a container, suitably of metal or glass. The container is closed to prevent loss of water and the reactants heated for the required time. A convenient and preferred procedure for preparing the reactant mixture is to make an aqueous solution containing the sodium aluminate and hydroxide and add this, preferably with agitation, to an aqueous solution of sodium silicate. The system is stirred until homogeneous or until any gel which forms is broken into a nearly homogeneous mix. After this mixing, agitation may be stopped as it is unnecessary to agitate the reacting mass during the formation and crystallization of the zeolite, however, mixing during formation and crystallization has not been found to be detrimental. The initial mixing of ingredients is conveniently done at room temperature but this is not essential.

In the synthesis of zeolite A, it has been found that the composition of the reacting mixture is critical. The crystallizing temperature and the length of time the crystallizing temperature is maintained are important variables in determining the yield of crystalline material. Under some conditions, for example too low a temperature for too short a time, no crystalline materials are produced. Extreme conditions may also result in the production of materials other than zeolite A.

The sodium form of zeolite A has been produced at 100° C., essentially free from contaminating materials, from reacting mixtures whose compositions, expressed as mixtures of the oxides, fall within either of the following ranges.

| | Range 1 | Range 2 |
|---|---|---|
| $SiO_2/Al_2O_3$ | 0.5-1.3 | 1.3-2.5 |
| $Na_2O/SiO_2$ | 1.0-3.0 | 0.8-3.0 |
| $H_2O/Na_2O$ | 35-200 | 35-200 |

When zeolite A has been prepared, mixed with other materials, the X-ray pattern of the mixture can be reproduced by a simple proportional addition of the X-ray patterns of the individual pure components.

Other properties, for instance molecular sieve selectivity, characteristic of zeolite A are present in the properties of the mixture to the extent that zeolite A is part of the mixture.

The adsorbents contemplated herein include not only the sodium form of zeolite A as synthesized above from a sodium-aluminum-silicate-water system with sodium as the exchangeable cation but also crystalline materials obtained from such a zeolite by partial or complete replacement of the sodium ion with other cations. The sodium cations can be replaced at least in part, by other ions. These replacing ions can be classified in the following groups: metal ions in group I of the periodic table such as potassium and silver, and group II metal ions such as calcium and strontium with the exception of barium. Other cationic metal zeolites are too complex in their preparation for use in the present invention.

The spatial arrangement of the aluminum, silicon, and oxygen atoms which make up the basic crystal lattice of the zeolite remains essentially unchanged by partial or complete substitution of the sodium ion by other cations. The X-ray patterns of the ion exchanged forms of the zeolite A show the same principal lines at essentially the same positions, but there are some differences in the relative intensities of the X-ray lines, due to the ion exchange.

Ion exchange of the sodium form of zeolite A (which for convenience may be represented as $Na_2A$) or other forms of zeolite A may be accomplished by conventional ion exchange methods. A preferred continuous method is to pack zeolite A into a series of vertical columns with suitable supports at the bottom; successively pass through the beds a water solution of a soluble salt of the cation to be introduced into the zeolite; and change the flow from the first bed to the second bed as the zeolite in the first bed becomes ion exchanged to the desired extent.

To obtain hydrogen exchange, a water solution of an acid such as hydrochloric acid is effective as the exchanging solution. For sodium exchange, a water solution of sodium chloride is suitable. Other convenient reagents are: for potassium exchange, a water solution of potassium chloride or dilute potassium hydroxide (pH not over about 12); for lithium, magnesium, calcium, ammonium, nickel, or strontium exchange, water solutions of the chlorides of these elements; for zinc exchange, a water solution of zinc nitrate; and for silver exchange, a silver nitrate solution. While it is more convenient to use water soluble compounds of the exchange cations, other solutions containing the desired cations or hydrated cations may be used.

Among the ways of identifying zeolite A and distinguishing it from other zeolites and other crystalline substances, the X-ray powder diffraction pattern has been found to be a useful tool. The X-ray powder diffraction lines of zeolite A are set forth in the previously referenced U.S. Patent 2,882,243 to R. M. Milton, incorporated herein by reference.

The zeolites contemplated herein exhibit adsorptive properties that are unique among known adsorbents. The common adsorbents, like charcoal and silica gel, show adsorption selectivities based primarily on the boiling point or critical temperature of the adsorbate. Activated zeolite A on the other hand exhibits a selectivity based on the size and shape of the adsorbate molecule. Among those adsorbate molecules whose size and shape are such as to permit adsorption by zeolite A, a very strong preference is exhibited toward those that are polar and polarizable. Another property of zeolite A that contributes to its unique position among adsorbents is that of adsorbing large quantities of adsorbate either at very low pressures, at very low partial pressures, or at very low concentrations. One or a combination of one or more of these three adsorption characteristics or others can make zeolite A useful for numerous gas or liquid separation processes where adsorbents are not now employed. The use of zeolite A permits more efficient and more economical operation of numerous processes now employing other adsorbents.

Common adsorbents like silica gel and charcoal do not exhibit any appreciable molecular sieve action whereas the various forms of zeolite A do. This is shown in the tables following in the specification, for typical samples of the adsorbents. In these tables the term "Weight percent adsorbed" refers to the percentage increase in the weight of the adsorbent. The adsorbents were activated by heating them at a reduced pressure to remove adsorbed materials. Throughout the specification the activation temperature for zeolite A was 350° C. and the pressure at which it was heated was less than about 0.1 millimeter of mercury absolute unless otherwise specified. Throughout the specification, unless otherwise indicated, the pressure given for each adsorption is the pressure of the adsorbate at the adsorption conditions.

In borderline cases where adsorbate molecules are too large to enter the pore system of the zeolite freely, but are not large enough to be excluded entirely, there is a finite rate of adsorption and the amount adsorbed will vary with time. In general, the recorded data represents the adsorption occurring within the first one or two hours, and for some borderline molecules, further adsorption may be expected during periods of ten to fifteen hours. Washing techniques, different heat treatments and the crystal size of the sodium zeolite A powder can cause very appreciable differences in adsorption rates for the borderline molecules.

The calcium and magnesium exchanged zeolite A have molecular sieve adsorptive properties characteristic of materials with larger pores than exist in sodium zeolite A. These two forms of divalent ion exchanged zeolite A behave quite similarly and adsorb all molecules adsorbed by sodium zeolite A plus some larger molecules.

There are numerous other ion exchanged forms of zeolite A such as lithium, ammonium, silver, zinc, nickel, hydrogen and strontium. In general, the divalent ion exchanged materials such as zinc, nickel and strontium zeolite A have a sieving action similar to that of calcium and magnesium zeolite A, and the monovalent ion exchanged materials such as lithium and hydrogen zeolite A behave similarly to sodium zeolite A, although some differences exist.

Another unique property of zeolite A is its strong preference for polar and polarizable molecules, providing of course that these molecules are of a size and shape permitting them to enter the pore system of the zeolites. This is in contrast to charcoal and silica gel which show a main preference based on the volatility of the adsorbate. A selectivity for polar and polarizable molecules is not new among adsorbents. Silica gel exhibits some preference for such molecules, but the extent of this selectivity is so much greater with zeolite A that separation processes based upon this selectivity become feasible.

Zeolite A shows a selectivity for adsorbates, provided that they are small enough to enter the porous network of the zeolites, based on the boiling points of the adsorbates, as well as on their polarity and polarizability. For instance, hydrogen which has a low boiling point is not strongly adsorbed at room temperature.

A further important characteristic of zeolite A is its property of adsorbing large amounts of adsorbates at low adsorbate pressures, partial pressures or concentrations. This property makes zeolite A uniquely useful in the more complete removal of adsorbable impurities from gas and liquid mixtures. It gives them a relatively high adsorption capacity even when the material being adsorbed from a mixture is present in very low concentrations, and permits the efficient recovery of minor components of mixtures. This characteristic is all the more important since adsorption processes are most frequently used when the desired component is present in low concentrations or low partial pressures. High adsorptions at low pressures or concentrations on zeolite A are illustrated in the following table, along with some comparative data for silica gel and charcoal.

| Adsorbate | Temperature (° C.) | Pressure (mm. Hg) | Weight Percent Adsorbed | | | | |
|---|---|---|---|---|---|---|---|
| | | | $Na_2A$ | CaA | MgA | Charcoal | Silica Gel |
| $CO_2$ | 25 | 1.6 | 5.9 | 5.9 | 5.3 | 0.5 | 0.5 |
| | 25 | 80 | 15.0 | 19.5 | 15.0 | 2.3 | 0.6 |
| | 25 | 750 | 18.9 | 24.4 | 22.2 | 10.0 | 4.6 |
| $H_2S$ | 25 | 0.5 | 8.5 | 12.7 | 6.6 | | |
| | 25 | 11 | 16.4 | 21.0 | 15.2 | | |
| | 25 | 198 | 23.7 | 29.3 | 25.9 | | |
| $CO_2$ | 0 | 50 | 17 | | | | |
| | | 600 | 21.8 | | | | |

Any cationic form of zeolite A having a pore size of at least 4 Angstroms is suitable for practicing the present invention. Smaller pore sized forms, such as potassium zeolite A do not admit hydrogen sulfide and the mercaptans.

The adsorption capacity of adsorbents usually decreases with increasing temperature, and while the adsorption capacity of an adsorbent at a given temperature may be sufficient, the capacity may be wholly unsatisfactory at a higher temperature. With zeolite A a relatively high capacity may be retained at higher temperatures.

Zeolite A may be activated by heating it in either air, a vacuum, or other appropriate gas to temperatures of as high as 600° C. The conditions used for desorption of an adsorbate from zeolite A vary with the adsorbate, by either raising the temperature or reducing the pressure, partial pressure or concentration of the adsorbate in contact with the adsorbent or a combination of these steps is usually employed. Another method is to displace the adsorbate by adsorption of another more strongly held adsorbate.

The present process for separating hydrogen sulfide from certain vapor mixtures depends upon two related properties of zeolite A with respect to the adsorbed phase. The first property is the selectivity of the internal surfaces of the crystal towards these strongly polar compounds as compared to normal saturated aliphatic hydrocarbons, hydrogen and carbon dioxide. As previously discussed and illustrated by the tables, zeolite A is capable of adsorbing all of these compounds based on a consideration of the zeolite A pore size and critical molecular dimensions of the compounds. For example, the pores of zeolite A are sufficiently large and in fact do receive methane, ethane, propane, hydrogen and carbon dioxide molecules.

Based on these considerations, one skilled in the art would logically conclude that zeolite A would not possess any particular selectivity for hydrogen sulfide in preference to the other constituents of the present vapor mixture. Contrary to these expectations, it has been discovered that zeolite A possesses an extremely strong selectivity for the enumerated sulfur compounds to the substantial exclusion of normal saturated aliphatic hydrocarbons, hydrogen and carbon dioxide. One reason for this selectivity is the highly polar nature of hydrogen sulfide as compared with the other possible constituents of the vapor mixture.

The second interrelated property of zeolite A which is utilized by a preferred form of the present invention is the relationship of the boiling point or vapor tension characteristics of an individual fluid or clearly related type of fluid to the capacity of the crystalline zeolite to adsorb the fluid at a given temperature and pressure. More specifically, it has been discovered that a relationship exists between the amount of fluid adsorbed and the temperature ratio $T_2/T_1$ where $T_1$ is the temperature in degrees Kelvin during adsorption, assuming that the temperature of the fluid and the adsorbent are in equilibrium. $T_2$ is the temperature in degrees Kelvin at which the vapor pressure of the fluid is equal to the partial pressure or vapor tension of the fluid in equilibrium with the zeolite adsorbent. Stated in another way, $T_2$ is the temperature at which the vapor pressure of the adsorbate is equal to the partial pressure of the adsorbate during adsorption. $T_2$ is actually the dew point of the adsorbate at the adsorption conditions.

This relationship is clearly shown in FIG. 1 which is a plot of the weight percent of sulfur compounds adsorbed versus the temperature ratio $T_2/T_1$ for both monovalent and divalent cationic forms of zeolite A having a pore size of at least about 4 Angstroms. The tested adsorbate in all cases was hydrogen sulfide, but it has been found that methyl and ethyl mercaptan behave similarly. The following table is a summary of the data from which FIG. 1 was prepared, the data for the first eight examples having been assembled from tests described in more detail in other parts of the specification.

That is, the $T_1$ values for these examples were obtained from the preceding portion of the specification and the $T_2$ values were read from the vapor pressure tables in "Industrial and Engineering Chemistry," vol. 39, page 517, April 1947.

TABLE C

| Ion Form Zeolite A | Pressure, mm. Hg | Wt. Percent H₂S Adsorbed | Temperature, °K. | | $T_2/T_1$ |
|---|---|---|---|---|---|
| | | | $T_1$ | $T_2$ | |
| Na | 0.5 | 8.5 | 298 | 133 | 0.45 |
| Na | 11 | 16.4 | 298 | 157 | 0.53 |
| Na | 198 | 23.7 | 298 | 191 | 0.64 |
| Ca | 0.5 | 12.7 | 298 | 133 | 0.45 |
| Ca | 11 | 21.0 | 298 | 157 | 0.53 |
| Mg | 0.5 | 6.6 | 298 | 133 | 0.45 |
| Mg | 11 | 15.2 | 298 | 157 | 0.53 |
| Mg | 198 | 25.9 | 298 | 191 | 0.64 |
| Ca | 5.0 | 11.1 | 298 | 150 | 0.49 |
| Ca | 12 | 14.3 | 298 | 158 | 0.52 |
| Ca | 5.0 | 5.8 | 348 | 150 | 0.43 |
| Ca | 12 | 7.9 | 348 | 158 | 0.46 |
| Ca | 50 | 12.0 | 348 | 174 | 0.50 |
| Ca | 12 | 2.2 | 423 | 158 | 0.37 |
| Ca | 50 | 5.0 | 423 | 174 | 0.41 |
| Ca | 150 | 7.1 | 423 | 191 | 0.45 |
| Ca | 237 | 9.1 | 423 | 196 | 0.46 |
| Na | 2.7 | 8.1 | 298 | 144 | 0.47 |
| Na | 1.6 | 0.8 | 423 | 136 | 0.32 |
| Na | 0.15 | 0.5 | 423 | 127 | 0.30 |
| Na | 5.0 | 10.6 | 298 | 150 | 0.49 |
| Na | 2.7 | 4.7 | 348 | 144 | 0.41 |
| Na | 12 | 8.1 | 348 | 158 | 0.46 |
| Na | 50 | 11.0 | 348 | 174 | 0.50 |

An inspection of Table C will reveal that it includes adsorbate temperatures from 25° C. to 150° C. and adsorbate pressures 0.5 mm. Hg to 237 mm. Hg. It was unexpectedly discovered that hydrogen sulfide, methyl mercaptan and ethyl mercaptan, all being freely adsorbed on zeolite A exhibit the same temperature ratio $T_2/T_1$ relationship to weight percent of sulfur compound adsorbed. That is, for a given $T_2/T_1$ value, the weight percent adsorbed will be the same for all of the previously defined sulfur compounds. The present invention utilizes this relationship in combination with the previously discussed polar compound selectivity property of certain crystalline zeolitic molecular sieves to provide a novel separation process.

The present invention combines the previously discussed properties of zeolite A in such a manner that a novel process is provided for separating hydrogen sulfide from a vapor mixture containing at least one member selected from the group consisting of hydrogen, carbon dioxide and normal saturated aliphatic hydrocarbons containing less than nine carbon atoms per molecule. In its broadest form, the process consists of contacting the vapor mixture with a bed of at least partially dehydrated zeolite A adsorbent material having a pore size of at least about 4 Angstroms, thereby adsorbing the hydrogen sulfide. The hydrogen sulfide-depleted vapor mixture is then discharged from the crystalline zeolite A bed.

It is to be understood that the expression "pore size," as used herein refers to the apparent pore size, as distinguished from the effective pore diameter. The apparent pore size may be defined as the maximum critical dimension of the molecular species which is adsorbed by the zeolitic molecular sieve in question under normal conditions. Maximum critical dimension may be defined as the diameter of the smallest cylinder which will accommodate a model of the molecule constructed using the best available values of bond distances, bond angles, and Van der Waal radii. Effective pore diameter is defined as the free diameter of the appropriate silicate ring in the zeolite structure. The apparent pore size for a given zeolitic molecular sieve will always be larger than the effective pore diameter.

The previously described contact between zeolite A adsorbent material and the vapor mixture is preferably effected under conditions such that the temperature ratio $T_2/T_1$ with respect to the inlet end of the bed and with respect to at least one of the enumerated sulfur compounds of the vapor mixture is between 0.31 and 1.0, where $T_1$ is the adsorption temperature and is less than 873° K., and $T_2$ is the temperature at which the one sulfur compound has a vapor pressure equal to its partial pressure in the vapor mixture. The lower limit of 0.31 for the temperature ratio $T_2/T_1$ is fixed by the discovery that below this value there is a smaller percentage change in adsorption capacity per unit change in the temperature ratio. In contrast, above 0.31 there is a larger percentage change in adsorption capacity per unit change in the temperature ratio. Stated in another way, if it is desired to obtain a certain incremental adsorbate loading at a specified adsorption temperature with a given feed stream, it would be necessary to increase the pressure of operation by a greater percent if the temperature ratio is below 0.31 than if it is maintained above this value in accordance with the invention. Also, the temperature ratio of 0.31 corresponds to a bed loading of about 0.5 weight percent adsorbate and if the temperature ratio were reduced below this value, a larger adsorption bed would be required with its attendant higher investment and operating expenses.

The upper limit of 1.0 for the temperature ratio should not be exceeded, because if the adsorption temperature is equal to or less than the dew point, condensation of the sulfur compound will occur, thereby essentially eliminating the sieving action of the zeolite A adsorbent. The broad upper limit of 873° K. for $T_1$ is due to the fact that above this temperature, the crystal structure of zeolite A will be disrupted or damaged with consequent loss of adsorption capacity and reduction in pore size, thereby fundamentally changing its adsorptive characteristics. The present adsorption process is most efficiently performed if $T_1$, the adsorption temperature, is less than 616° K. but higher than 283° K. This is for the reason that above such range, the hydrocarbon constituents of the vapor feed stream in contact with zeolite A will tend to isomerize, crack, aromatize and polymerize, all of which will clog the pores and cause loss of capacity of zeolite A molecular sieve. Also, to employ adsorption temperatures below about 283° K., a refrigerating system would be required which increases the complexity and expense of operation. Also, for maximum efficiency, $T_2$ the dew point of one of the sulfur compounds of the fluid mixture is preferably below 499° K. corresponding to the critical temperature of ethyl mercaptan. This is to more effectively utilize the adsorptive capacity of zeolite A.

The present invention also contemplates a process for continuously separating hydrogen sulfide from a vapor mixture containing at least one member of the group consisting of normal saturated aliphatic hydrocarbons containing less than nine carbon atoms per molecule, hydrogen and carbon dioxide. This continuous process includes two steps, an adsorption stroke and a regeneration stroke. The adsorption stroke is the same as the previously described adsorption where the temperature ratio $T_2/T_1$ is between 0.31 and 1.0, and the broad range for $T_1$ is less than 873° K. In the regeneration stroke, at least part of the adsorbed hydrogen sulfide is removed by subjecting the zeolite A adsorbent to conditions such that the temperature ratio $T_2/T_1$ at the end of the regeneration stroke with respect to at least one of the adsorbed sulfur compounds, is less than the temperature ratio at the end of the adsorption stroke. Also, the difference in total adsorbate loading between the ends of the adsorption and regeneration stroke is at least 0.1 weight percent for increased efficiency of the overall continuous process. A lower differential adsorbate loading would entail prohibitively large adsorber units. During the regeneration stroke, $T_1$ is the regeneration temperature and is less than 873° K. for the broad range, and $T_2$ is the temperature at which the hydrogen sulfide has a vapor pressure equal to the partial pressure of the compound over the zeolite A bed at the end of the regeneration. It will be understood by those skilled in the art that at least two adsorbent beds may be provided, with one bed on adsorption stroke and the other bed on regeneration stroke. The respective flows are then periodically switched when the first bed becomes loaded with the adsorbate, so that the latter is placed on regeneration stroke and the second bed is placed on-stream.

The continuous process is most efficiently performed if $T_1$, the adsorption temperature, is less than 616° K. but higher than 283° K., for previously stated reasons. Also, for maximum efficiency during the adsorption stroke, $T_2$ the dew point of the hydrogen sulfide of the vapor mixture, is below 499° K. During the regeneration stroke, $T_1$ is preferably above 283° K. and below 616° K., also for the previously discussed reasons.

It will be understood by those skilled in the art that the temperature ratio may be adjusted by well-known methods as for example heating the bed by direct or indirect heat transfer, employing a purge gas, or by drawing a vacuum on the bed during the regeneration stroke. Also, during the adsorption stroke, the ratio may be adjusted for favorable operation by varying either or both the temperature and the pressure.

The many advantages of the invention are illustrated by the following examples.

*Example I*

It is desired to remove hydrogen sulfide from a methane-ethane vapor stream provided at 600 p.s.i.a., the feed mixture comprising 0.035 mole fraction $H_2S$, 0.035 mole fraction ethane and the remainder methane. The mixture is to be passed through a bed of sodium zeolite A at a temperature of 218° C. (425° F.). The hydrogen sulfide-loaded zeolite A bed is to be regenerated at the same temperature under a vacuum pressure sufficient to obtain a loading of 1.5 weight percent adsorbate at the end of the regeneration stroke.

Figure 2:
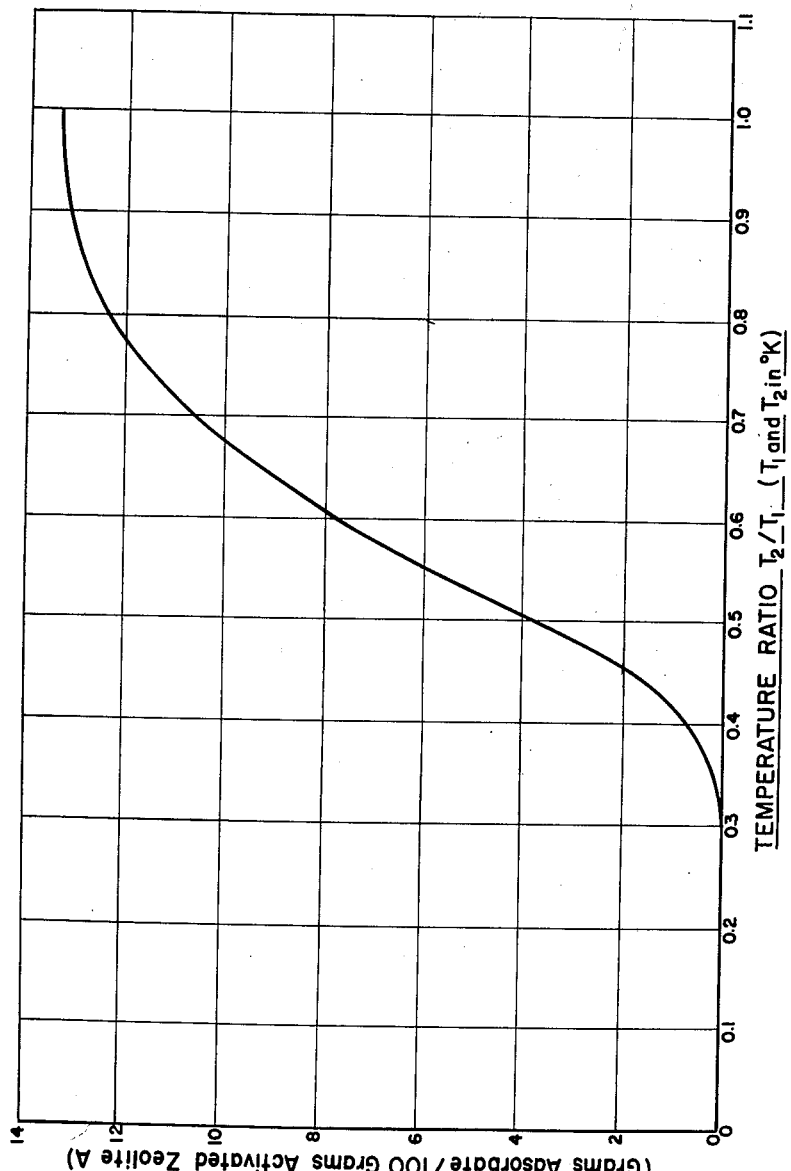
FIG. 2 is a graph showing the amount of $C_1$ through $C_8$ normal saturated aliphatic hydrocarbons adsorbed versus the temperature ratio $T_2/T_1$ for various forms of zeolite A.

The potential capacity of the bed to adsorb hydrogen sulfide at the bed inlet section may be determined as follows: Since the partial pressure of hydrogen sulfide at the inlet end will be 21 p.s.i.a., $T_2$ will be 221° K., as extrapolated from the previously referenced vapor pressure table. Accordingly $T_2/T_1$ will be 221/491 or 0.45. This temperature ratio will provide a loading of 7.0 weight percent hydrogen sulfide on the zeolite A adsorbent as determined by a reading of the FIG. 1 graph. The potential capacity of the adsorbent bed inlet end for methane and ethane may be determined in a similar manner. That is, $T_2$ for ethane is 193° K., so that $T_2/T_1$ will be 0.39. Referring now to FIG. 2, which is a plot of the weight percent of normal saturated aliphatic hydrocarbons adsorbed versus the temperature ratio $T_2/T_1$, this corresponds to a potential loading of only about 0.6 weight percent ethane. For methane, $T_2$ is 186° K., so that $T_2/T_1$ will be 0.38. Referring again to FIG. 2, the potential loading is only about 0.5 weight percent methane. The adsorption stroke can be terminated when the amount of hydrogen sulfide reaches the maximum tolerable concentration.

On regeneration, the end loading is to be 1.5% adsorbate, which corresponds to a $T_2/T_1$ value of 0.35. If a pressure swing cycle is to be employed, $T_1$ is fixed at 491° K. so that the dew point $T_2$ must change and be equal to 174° K. or −99° C. This corresponds to a hydrogen sulfide vapor pressure of 50 mm. Hg, which should be the desorption pressure of the cycle. Thus, regeneration is accomplished by maintaining a constant adsorption bed temperature but drawing a vacuum on the system.

*Example II*

It is desired to remove hydrogen sulfide from a methane-hydrogen stream provided at 200 p.s.i.a., the feed mixture comprising 0.00005 mole fraction $H_2S$, 0.12 mole fraction methane, 0.0005 mole fraction propane, the remainder being hydrogen. This mixture is to be passed through a bed of sodium zeolite A at 25° C. The hydrogen sulfide-loaded zeolite A bed is to be regenerated at elevated temperature using the feed mixture as a purge gas to obtain a loading of 0.5 weight percent at the end of the stroke.

The potential capacity of the bed to adsorb hydrogen sulfide at the bed inlet section may be determined as follows: Since the partial pressure of hydrogen sulfide at the inlet end will be 0.01 p.s.i.a., $T_2$ will be 134° K., as determined from the previously referenced vapor pressure table. Accordingly, $T_2/T_1$ will be 134/298 or 0.45. This temperature ratio will provide a loading of 7.0 weight percent hydrogen sulfide on the zeolite A adsorbent as determined by a reading of the FIG. 1 graph. The potential capacity of the adsorbent bed for methane, propane and hydrogen may be determined in a similar manner. That is, $T_2$ for propane is 152° K. so that $T_2/T_1$ will be 0.51. Referring again to FIG. 2, this corresponds to a potential loading of about 4.0 weight percent propane. However, as previously discussed, zeolite A will adsorb hydrogen sulfide to the substantial exclusion of propane due to the former's greater polarity. For methane, $T_2$ is 116° K. so that $T_2/T_1$ will be 0.39. Referring to FIG. 2, the potential loading is only about 0.6 weight percent methane.

With regard to hydrogen, it has been determined experimentally that when $T_2/T_1$ is 0.07, the hydrogen loading on zeolite A is zero. Thus, in the present example, $T_2=32°$ K. and $T_2/T_1$ is 0.11 so that the hydrogen loading is negligible.

On regeneration, the end loading is to be 0.5 weight percent adsorbate, which corresponds to a $T_2/T_1$ value of 0.31. If a temperature swing-purge cycle is to be employed, $T_2$ is 134° K. as previously determined and $T_1$ must be 433° K. or 160° C. Thus, regeneration is achieved by heating either the adsorbent and/or the inlet gas mixture sufficiently to provide a regeneration temperature of 160° C. while using the inlet gas for purging.

Although the preferred embodiments have been described in detail, it is contemplated that modifications of the process may be made and that some features may be employed without others, all within the spirit and scope of the invention as set forth herein.

Figure 3:
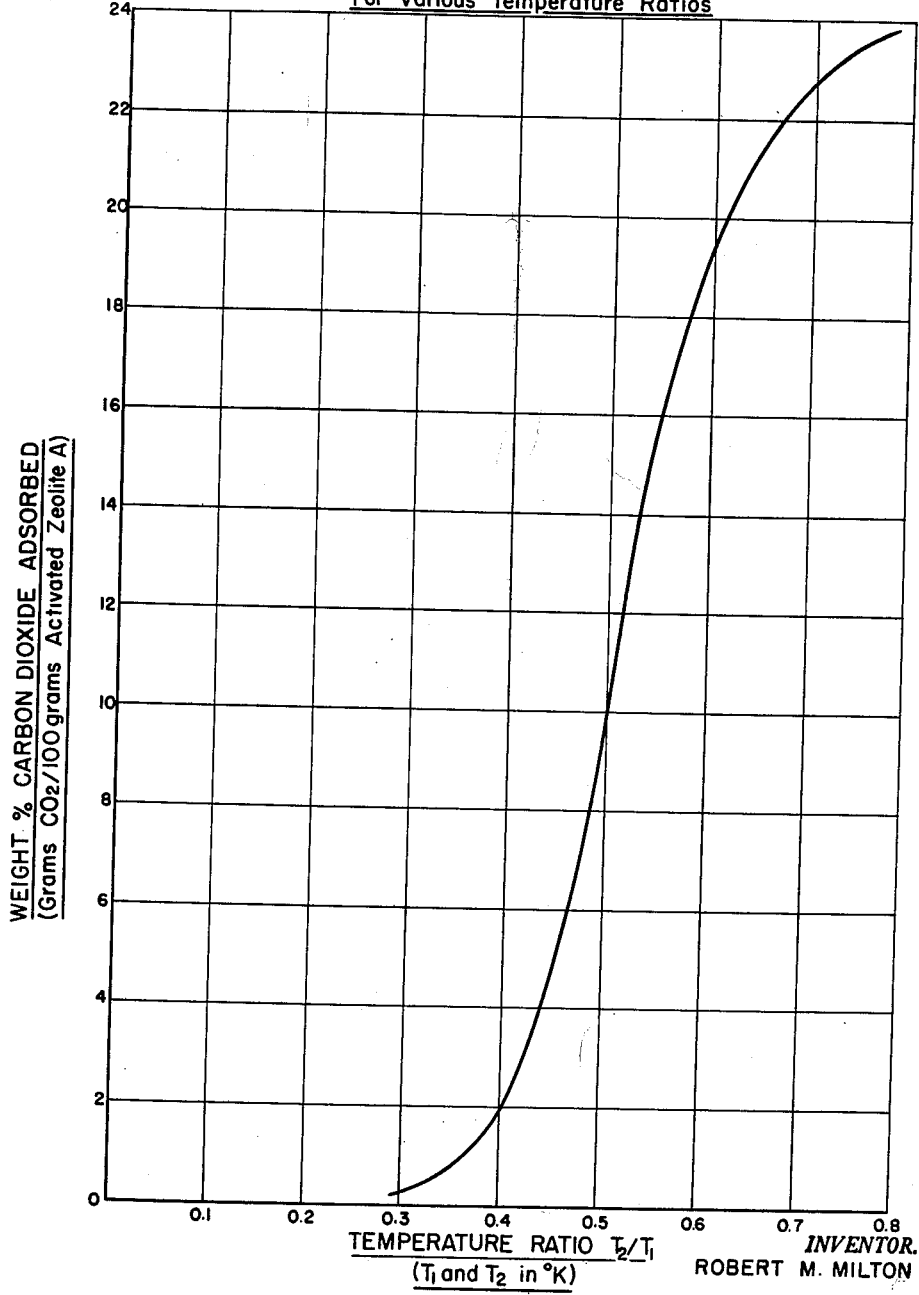
FIG. 3 is a graph showing the amount of carbon dioxide adsorbed versus the temperature ratio $T_2/T_1$ for various forms of zeolite A.

When the inlet vapor mixture contains $CO_2$, the potential capacity of the zeolite A adsorbent for this constituent is similarly determined by reference to the vapor pressure tables and FIG. 3.

This is a continuation-in-part application of copending application Serial No. 400,385, filed December 24, 1953, in the name of R. M. Milton, now abandoned.

What is claimed is:

1. A process for separating hydrogen sulfide from a vapor mixture containing hydrogen sulfide and at least one member of the group consisting of hydrogen, carbon dioxide, methane and ethane which comprises contacting said vapor mixture with a bed of at least partially dehydrated crystalline zeolite A adsorbent material having a pore size of at least about 4 Angstroms, and thereafter discharging the hydrogen sulfide-depleted vapor stream from the bed.

2. A process for separating hydrogen sulfide from a vapor mixture containing hydrogen sulfide and at least one member of the group consisting of hydrogen, carbon dioxide and normal saturated aliphatic hydrocarbons containing less than nine carbon atoms per molecule which comprises contacting said vapor mixture with a bed of at least partially dehydrated crystalline zeolite A adsorbent material, said material being capable of adsorbing molecules that have a maximum dimension of the minimum projected cross-section up to about 5.5 Angstroms, and thereafter discharging the hydrogen-sulfide-depleted vapor stream from said bed.

3. A process for separating hydrogen sulfide from a vapor mixture containing hydrogen sulfide and at least one member of the group consisting of hydrogen, carbon dioxide, methane and ethane and at least one member of the group consisting of normal saturated aliphatic hydrocarbons containing more than two but less than nine carbon atoms per molecules and molecules with a maximum dimension of the minimum projected cross-section larger than about 5.5 Angstroms which comprises contacting said vapor mixture with a bed of at least partially dehydrated crystalline zeolite A adsorbent material having a pore size of at least about 4 Angstroms, and thereafter discharging the hydrogen sulfide-depleted vapor stream from the bed.

4. A process for separating hydrogen sulfide from a vapor mixture containing hydrogen sulfide and molecules with a maximum dimension of the minimum projected cross-section larger than about 5.5 Angstroms and at least one member of the group consisting of hydrogen, carbon dioxide and normal saturated aliphatic hydrocarbons containing less than nine carbon atoms per molecule which comprises contacting said vapor mixture with a bed of at least partially dehydrated crystalline zeolite A adsorbent material, said material being capable of adsorbing molecules that have a maximum dimension of the minimum projected cross-section up to about 5.5 Angstroms and thereafter discharging the hydrogen-sulfide-depleted vapor stream from said bed.

5. A process as described in claim 1 wherein the vapor mixture contains hydrogen sulfide and methane.

6. A process as described in claim 1 wherein the vapor mixture contains hydrogen sulfide and ethane.

7. A process is described in claim 2 wherein the vapor mixture contains hydrogen sulfide and normal saturated aliphatic hydrocarbons containing less than nine carbon atoms per molecule.

References Cited in the file of this patent

UNITED STATES PATENTS 2,818,449     Christensen et al.     Dec. 31, 1957

OTHER REFERENCES

"Molecular-Sieve Action of Solids" by R. M. Barrer, Quarterly Reviews, London Chemical Society, vol. III, 1949, pages 293 to 320.

"Examine These Ways To Use Selective Adsorption," Petroleum Refiner, vol. 36, No. 7, July 1957, pages 136–140.